United States Patent [19]

Hasebe

[11] 4,105,528
[45] Aug. 8, 1978

[54] APPARATUS FOR DECOMPOSITION OF AQUEOUS LIQUID

[75] Inventor: Shigeta Hasebe, Yokokoshi, Japan

[73] Assignee: Haruji Hosoda, Tokyo, Japan

[21] Appl. No.: 772,250

[22] Filed: Feb. 25, 1977

[30] Foreign Application Priority Data

Feb. 28, 1976 [JP]  Japan ............................... 51-21344

[51] Int. Cl.$^2$ ............................................. C25B 15/00
[52] U.S. Cl. ................................. 204/237; 204/270; 204/272; 204/278; 204/DIG. 5
[58] Field of Search ............... 204/272, 247, 256, 258, 204/266, 270, 245, 255, 257, 263, 269, 129, 275, 278, 260, 234–239, DIG. 5

[56] References Cited
U.S. PATENT DOCUMENTS

| 2,285,553 | 6/1942 | Arlt | 204/DIG. 5 |
| 3,410,783 | 11/1968 | Tomter | 204/256 X |
| 3,433,729 | 3/1969 | Proskuryakov et al. | 204/272 X |
| 3,957,596 | 5/1976 | Seto | 204/272 X |
| 3,969,214 | 7/1976 | Harris | 204/DIG. 5 X |

Primary Examiner—Charles F. Lefevour

[57] ABSTRACT

An apparatus for decomposition of liquid in which vortical negative and positive electrodes are arranged in a closed relation but in short free positions and these two electrodes are supplied with a power through external terminals and the electrolyte is placed to flow between the negative and positive electrodes for the electrolysis between two electrodes under the function of the potential magnetic field formed by the coil current which is generated by the electrodes with active movement of an electrolytic ion so that the electrolysis of water takes place smoothly under the spin functions of the atom and electron.

7 Claims, 3 Drawing Figures

APPARATUS FOR DECOMPOSITION OF AQUEOUS LIQUID

BACKGROUND AND SUMMARY OF THE INVENTION

This invention relates to an apparatus for decomposition of liquid wherein an electrolyte in flow is subjected to an electrolysis for production of gases.

As is well known, water is composed of a hydrogen atom and an oxygen atom. When water is sufficiently magnetized, each constitutive atom is also weakly magnetized to rotate the elementary particle in a regular direction. This rotation of the elementary particle is generally called as "spin". That is, the spin function is caused by an electron, atomic nucleous, atom and even by the molecule. When a negative electrode is immersed in the electrolyte (NaOH solution) for applying a voltage thereto to cause the elementary particle to react with the electric field, the coupling state of the hydrogen with the oxygen is varied and the electrolysis is facilitated under the function of the spin.

In accordance with the present invention, vortical negative and positive electrodes are arranged in a closed relation but in short free positions and these two electrodes are supplied with a power through external terminals and the electrolyte is placed to flow between the negative and positive electrodes. Thus, the electrolyte is subjected to the electrolysis between two electrodes under the function of the potential magnetic field formed by the coil current which is generated by the electrodes with active movement of an electrolytic ion ($Na^+$, $OH^-$) so that the electrolysis of water takes place smoothly under the spin functions of the atom and electron.

It has been confirmed that the rate of the electrolysis of water according to the invented process is approximately 10 or more times (approximately 20 times on calculation) as that of the conventional electrolysis.

The structural design of electrolytic cell in accordance with the invented system is characterized in that the electrolyte flowing through the supply ports provided at the lower portion of the electrolytic cell is subjected to the potential magnetic field in the presence of the permanent magnet and that the electrodes for electrolysis is subjected to the more potential magnetic and electric fields to obtain a sufficient spin effect.

It is, therefore, a general object of the invention to provide a novel apparatus for decomposition of liquid in which an electrolyte (NaOH) solution is subjected to magnetic field to carry out an electrolysis under the function of the spin of an element constituting water molecule thereby to produce a great amount of gas with less consumption of electric energy.

A principal object of the invention is to provide an apparatus for decomposition of liquid including a liquid circulating system for separation of gas and liquid in which positive and negative vortical electrodes are arranged to traverse a flow path of liquid and said vortical electrodes at their opposite ends being arranged with magnetic materials to apply a predetermined voltage for a liquid passing through a magnetic field by said positive and negative vortical electrodes thereby to promote generation and separation of cation and anion with a high efficiency in production of a large quantity of gases by way of an electrolysis of liquid.

Other objects and advantages of the present invention will become apparent as the detailed description thereof proceeds.

BRIEF DESCRIPTION OF THE DRAWINGS

The invention will be described more in detail in the following with reference to the accompanying drawings, wherein.

DESCRIPTION OF THE PREFERRED EMBODIMENT

Figure 1:
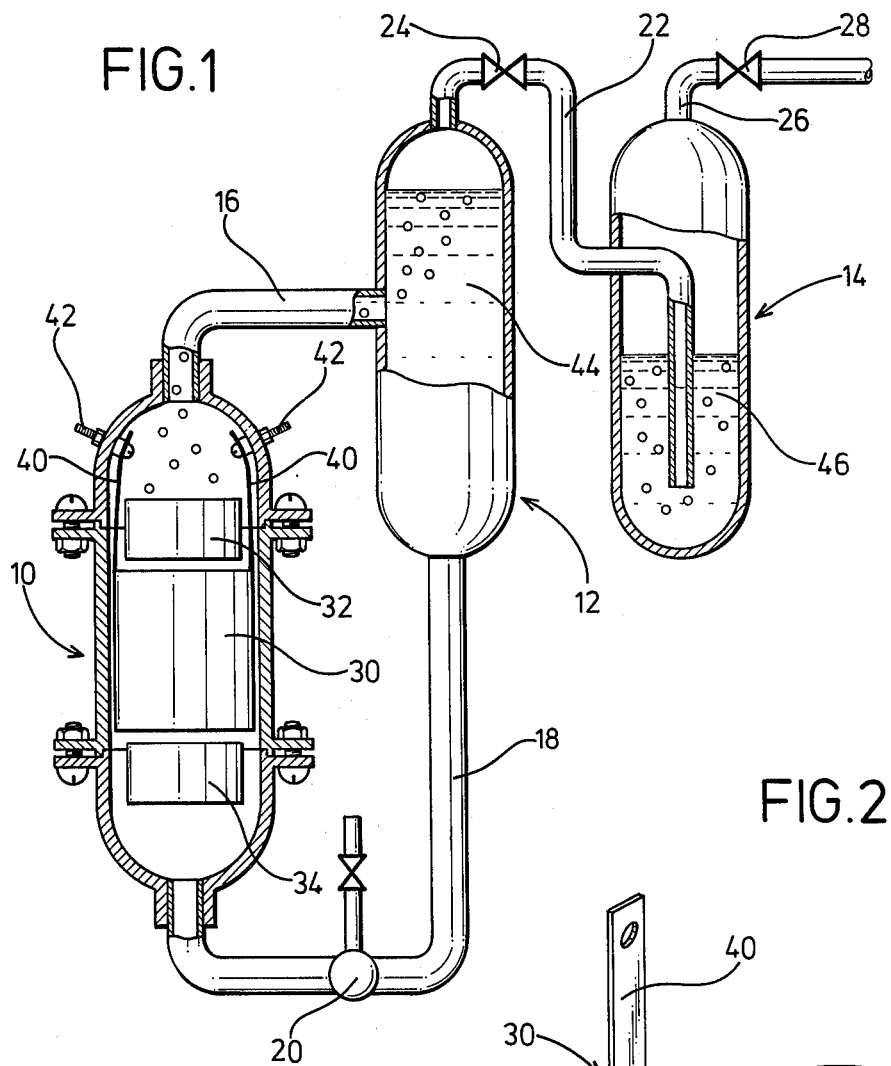
FIG. 1 is a partially cross-sectional schematic elevation of an apparatus in accordance with the invention.
Figure 2:
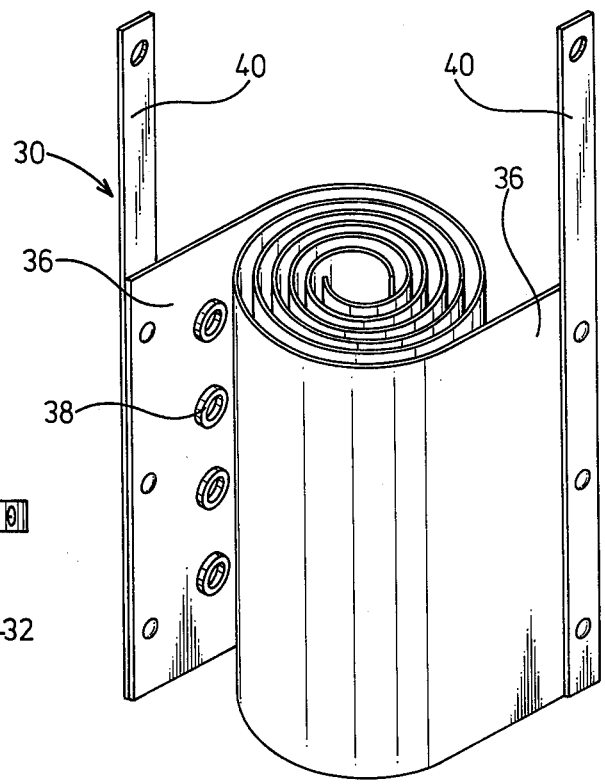
FIG. 2 is a perspective view of electrodes arranged in accordance with the invention.
Figure 3:
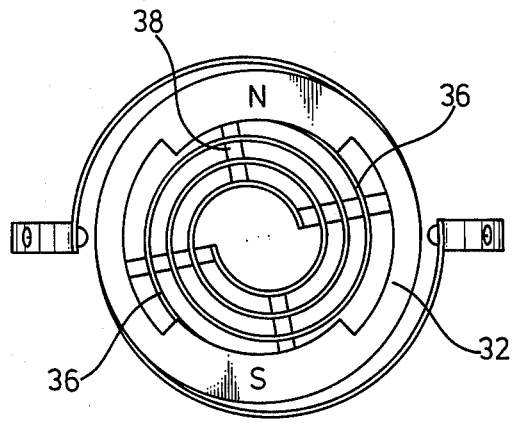
FIG. 3 is a plan view of electrodes with magnetic materials.

In FIG. 1, an electrolytic cell 10, a gas-liquid separation tank 12 and a gas washing tank 14 are vertically arranged in juxtaposition with a location of the electrolytic cell 10 in a little lower level than the others.

These cell 10 and tanks 12, 14 are communicated with each other through a delivery pipe 16 which communicates the top of the electrolytic cell 10 with the middle portion of the gas-liquid separation tank 12, a feed-back pipe 18 provided with a pump 20, which communicates the bottom portion of the gas-liquid separation tank 12 with the bottom portion of the electrolytic cell 10, and a conduit 22, which is extended from the top portion of the gas-liquid separation tank 12 through a valve 24 into the bottom portion of the gas washing tank 14. To the top portion of the gas washing tank 14 is connected a drain pipe 26 through a valve 28.

In the electrolytic cell 10, positive and negative vortical electrodes 30 of diameters as defined in accordance with an internal diameter of the electrolytic cell 10 are arraned coaxially, and at upper and lower positions of the vortical electrode 30 are arranged magnet rings 32 and 34 of ferrite and the like, of which positive and negative magnetic poles are confronted therein so that a magnetic field generated is orthogonal to the axis of the electrolytic cell.

The vortical electrodes 30 are composed of two metal strips 36 which are wound into vortical shapes with a plurality of cylindrical insulating spacers 38 of rubber and the like interposed therebetween in attachment to the surface of the metal strips 36.

From the metal strips 36 are withdrawn lead wires 40, 40 which are in turn connected respectively to positive or negative electrode terminals provided in the inner wall of the electrolytic cell.

The electrolytic cell 10 and the gas-liquid separation tank 12 are filled with a electrolyte 44 which may be circulated by the pump 20 whereas the gas washing tank 14 is filled with a washing liquid 46 to such a preferred level that gases gushing out of the conduit 22 is well washed.

The apparatus in accordance with the present invention may be well applicable to an electrolysis of flowing water for production of hydrogen gas and oxygen gas at a high efficiency. That is to say, the electrolytic cell 10 and the gas-liquid separation tank 12 are filled with the electrolyte 44 which is constrained by operation of the pump 20 to flow through a magnetic field in an annular path in which positive and negative magnetic poles N, S of the magnets 32 and 34 are confronted and through the metal plates 36 of the vortical electrode 30 to impart an orientation to an electrical migration of cation and anion with increased gas separation rate and promotion of electrolysis.

Especially, the flowing oxygen gas serves to facilitate a gasification as it has a magnetic property of variable under an influence of the magnetic field. The vortical electrodes 30 in accordance with the invention brings a remarkable increasement in the electrolytic rate since a hydraulic diameter in a space between metal strips of the electrode 30 is reduced and hence the flow velocity in the space is increased so that a positive convection in the gap serves to cause turbulence and accordingly gasified bubbles produced by an electrolysis and attached to the surface of the electrode 30 are removed instantly in replacement by fresh ions.

The vortical construction of positive and negative metal strips alternately opposing to each other enables a desired reduction in bulk of the cell, while increasing a contacting area with the electrolyte 44 with relatively short migration distance of ions for promotion of gasification. On the other hand, insulating spacers 38 interposed between the positive and negative metal strips 36 serves to develope desired turbulence of the electrolyte passing through the space.

The liquid circulating system for separation of gas and liquid requires no other driving unit except the circulation pump 20 to achieve separation of gas and liquid by utilizing differences in water heads developed among the cell 10 and the tanks 12 and 14. In other words, a flow of gas-liquid mixture supplied from electrolytic cell 10 is fed into the gas-liquid separation tank 12 where due to the difference in buoyancy of gases and liquid, gas rises and is fed into the gas washing tank 14 whereas the liquid goes down and is returned again to the electrolytic cell 10. The washing tank 14 is filled with convenient washing liquid 46 so that gases gushing out of conduit 22 are washed and fed into the drain pipe 26. Thus, the apparatus may be constructed at reduced cost without complexity.

As hereinbefore described, the magnets 32 and 34 provide positive and negative magnetic poles N, S which are confronted in the annular wall for facilitating an alignment between the cross section of the flow-path of the liquid and the annular portion of the magnets 32, 34 and a generation of a magnetic field in a direction perpendicular to that of the liquid flow, so that the liquid is ensured to flow in the magnetic field.

| Experimental Data | |
|---|---|
| Room Temperature | 20° C |
| Atmospheric Pressure | 103 millibar |
| Temperature of Aqueous Solution | 25° C |
| Humidity | 43% |
| Voltage | 2.8V |
| Current | 30A |
| Amount of Decomposed and Produced | |

| -continued | |
|---|---|
| Experimental Data | |
| Gas(Mixed Gas of Hydrogen and Oxygen) | 116cc/sec |
| Per Coulomb (1A × 1 Sec) | |
| Hydrogen | 2.6 cc |
| Oxygen | 1.3 cc |

The theoretical amount of generation of hydrogen and oxygen by the electrolysis in accordance with the present system are as mentioned below.

Hydrogen $H_2$ - 1 gram = 11.2 l (0° C 1 atm)
Oxygen $O_2$ - 8 gram = 5.6 l (0° C 1 atm)

However, the experimental data have showed the following facts.

| Per 1 Coulomb | Hydrogen | 2.6 cc at 20° C |
|---|---|---|
| | Oxygen | 1.3 cc at 20° C |
| Per 1 Faraday | Hydrogen | 2.6 cc × 96540 ≈ 250 |
| | Oxygen | 1.3 cc × 96540 ≈ 125 |
| | (where 1 F = 96540 Coulomb) | |

Even by correction at the room temperature of 20° C, the rate of generation over 20 times could be obtained.

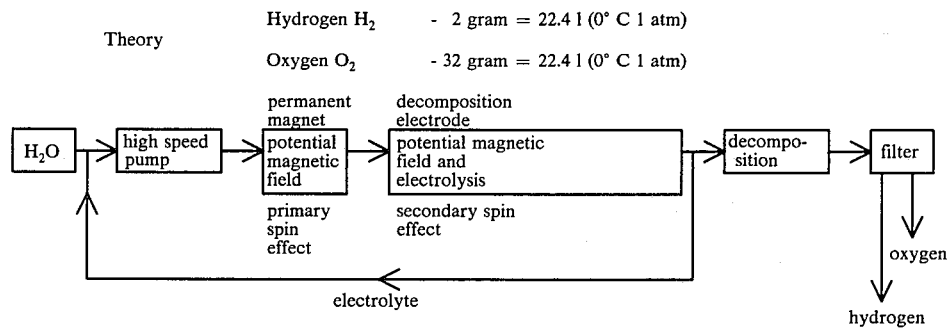

Theory
Hydrogen $H_2$ - 2 gram = 22.4 l (0° C 1 atm)
Oxygen $O_2$ - 32 gram = 22.4 l (0° C 1 atm)

As hereinbefore fully described in accordance with the invention generation and separation of cation and anion in a flowing liquid is facilitated at a high efficiency of gas production rate by the electrolysis.

While certain preferred embodiments of the invention have been illustrated by way of example in the drawings and particularly described, it will be understood that various modifications may be made in the constructions and that the invention is no way limited to the embodiments shown.

What I claim is:

1. Apparatus for the decomposition of aqueous liquid whereby gas is formed comprising a cell, having an inlet at one end and an outlet at the other, positive and negative electrodes mounted within said cell between said inlet and outlet connected to a source of electric current, said electrodes being wound about each other in substantially coaxial helices to form a vortex transverse to the flow of liquid, and magnetic means mounted with said cell at each of the axial ends of said electrodes.

2. The apparatus according to claim 1, wherein said inlet and outlet means are at axial ends of said electrodes.

3. The apparatus according to claim 2, including a gas-liquid separation tank and a gas-washing tank each vertically arranged in juxtaposition, conduit means connecting the top of the cell with the mid-portion of the gas-liquid separation tank, a feed-back conduit connecting the bottom end of the gas-liquid separation tank with said pump, a conduit connecting the top end of the gas-liquid separation tank and the lower portion of the gas-washing tank, a valve inserted in said latter conduit and a drain pipe connected to the top end of the gas-washing tank for exhaust of the gas.

4. The apparatus according to claim 1, including a pump at the inlet for feeding the liquid under pressure through said cell.

5. The apparatus according to claim 1, wherein each of said electrodes is formed of at least one sheet of metallic material, each electrode being provided with a lead wire secured to the cell, and having contact means extending through the wall thereof.

6. The apparatus according to claim 1 including insulating spaces interposed between said electrodes.

7. The apparatus according to claim 1, wherein said magnetic means comprise annular members having diametrically opposed positive and negative poles lying orthogonal to the flow of liquid.

* * * * *